United States Patent [19]

Scholz

[11] 3,786,178

[45] Jan. 15, 1974

[54] CIRCUIT FOR PRODUCING A THREE LINE SEQUENTIAL COLOR TELEVISION SIGNAL

[75] Inventor: Werner Scholz, Gehrden, Germany

[73] Assignee: TED Bildplatten Aktiengesellschaft AEG-Telefunken . Teldec, Zug, Switzerland

[22] Filed: Dec. 6, 1972

[21] Appl. No.: 312,576

[30] Foreign Application Priority Data

Dec. 9, 1971 Germany.................... P 21 61 106.3

[52] U.S. Cl. ........................................... 178/5.4 CD

[51] Int. Cl. ............................................ H04n 1/22

[58] Field of Search ................. 178/5.4 CD, 5.4 MA

[56] References Cited

UNITED STATES PATENTS 3,560,635 2/1971 Bruch.......................... 178/5.4 CD

*Primary Examiner*—Richard Murray
*Assistant Examiner*—Fay Konzem
*Attorney*—George H. Spencer et al.

[57] ABSTRACT

A recording circuit for producing a three line sequential color television signal (TRIPAL) to be used with a playback circuit wherein the luminance signal is formed by combining the recorded chrominance signals in a matrix which differs from the standard luminance signal matrix, i.e., M-TRIPAL. In the recording circuit, a luminance signal $Y_M$ is formed by combining the three color signals in a matrix which is the same as that to be used during playback and this luminance signal $Y_M$ is subtracted from each of the color signals which have been sequentially sampled at horizontal picture line sweep frequency.

7 Claims, 2 Drawing Figures

CIRCUIT FOR PRODUCING A THREE LINE SECTIONAL COLOR TELEVISION SIGNAL

BACKGROUND OF THE INVENTION

The present invention relates to an improved recording circuit for a three line sequential color television signal, i.e., a TRIPAL signal. More particularly the present invention is directed to an improved recording circuit for a three line sequential color television signal for use with an M-TRIPAL playback arrangement.

Various circuits for converting a three line sequential color television signal (TRIPAL) to a simultaneous color television signal containing a luminance signal are known in the art. One such circuit, which is of particular interest here, is shown in German Pat. No. 1,936,594, issued Dec. 2nd, 1971, and in U.S. Pat. No. 3,560,635, issued Feb. 2nd, 1971. According to the circuit disclosed in this patent two delay lines each having a delay of one horizontal picture line period and switches operating at the horizontal scanning frequency are used to repeat each one of the three color signals during its off periods, i.e., the periods when the other color signals are being received.

The invention according to this patent consists in that the luminance signal is produced during playback by the addition, in a matrix, of the currently received color signal, the sequential signal which is delayed by one horizontal line period and the sequential signal which is delayed by two horizontal line periods. With this circuit arrangement, the amount of circuitry required for the regeneration of the luminance signal is reduced and the number of errors during playback, particularly concerning horizontal edges, is reduced.

With the circuit disclosed in the above mentioned patent, the luminance signal produced during playback differs from the standard color television luminance signal Y because the matrix used to combine the color signals red (R), green (G), and blue (B) combines these signals in a different amplitude ratio than does the standard matrix. Consequently the luminance signal produced according to the above patent is generally designated as $Y_M$ and the playback system as M-TRIPAL.

Since it is desirable, however, that the luminance signal produced during playback have the correct standard composition, it has been proposed to predistort the signal during recording in such a manner that playback arrangement according to the above mentioned patent will directly generate a luminance signal having the correct standard composition.

SUMMARY OF THE INVENTION

It is therefore an object of the present invention to provide a particularly simple circuit with which a three line sequential color television signal can be produced during recording which during playback by means of the circuitry disclosed in the above mentioned patent, i.e., M-TRIPAL, directly results in a correct luminance signal Y.

The above object is accomplished according to the present invention in that in the recording circuit instead of forming the chrominance signals by subtracting the standrad luminance signal Y from each of the sequential red, green and blue color signals, each of which is one picture line in duration, a luminance signal $Y_M$ is generated by combining the color signals in a matrix which is the same as that to be used during playback and this luminance signal is subtracted from each of the three sequential color signals to form the chrominance signals in a subtracting circuit which for example, includes an inverting amplifier connected to the output of the matrix and an adding circuit having one input connected to the output of the inverting amplifier and to whose other inputs are applied the sequential color signals.

The sequential chrominance signals appearing at the output of the subtracting circuit are in turn passed through a low pass filter which limits the bandwidth to the lower frequency range of the color video signal, i.e., 0.5 MHz, and the output of the filter is added in a further adding circuit to the standrad luminance signal Y which is generated in a further matrix from the three color signals. The output of this further adding circuit is then fed to a video recorder.

The amount of additional circuitry required for accomplishing the present invention is small. That is, since the subtraction circuit used to form the chrominance signals and the circuitry for generating the luminance signal Y and for combining same with the chrominance signals are required in any case, the only additional circuitry required according to the invention is the additional matrix which combines the color signals R, G, B in a manner different than in the standard matrixing circuits to generate the luminance signal $Y_M$ which is applied to one of the inputs of the subtracting circuit. Since the additional matrix for forming this luminance signal $Y_M$ is principally the same type as that which is used during playback to produce the luminance signal, the same matrix can be used both for the production of the signal (recording) and for the playback.

DESCRIPTION OF THE PREFERRED EMBODIMENTS

Figure 1:
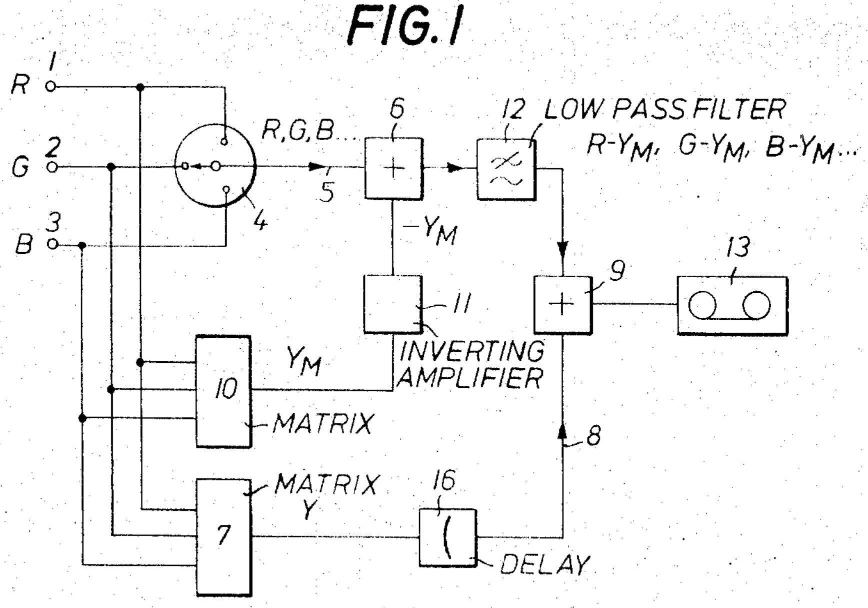
FIG. 1 is a block circuit diagram of a recording circuit according to the present invention.

As shown in FIG. 1, the three color signals R, G, B, are fed to the three input terminals 1, 2 and 3 of the recording circuit to which are connected the three input contacts of a switch 4 having a single output connected to a lead 5. The switch 4 is operated at the horizontal picture line scanning frequency, and thus samples each of the color signals for one horizontal picture line. The three line sequential color signal appearing on lead 5 is fed to one input of an adding circuit 6. The three color signals R, G, B are also fed to the inputs of a matrix 7 which combines these signals according to the known standard equation $$Y = 0.59\ G + 0.3\ R + 0.11\ B$$

to form the standard color television luminance signal Y. The output signal from the matrix 7, i.e, the standard luminance signal Y, is fed via a delay member 16 (whose function will be explained below) and lead 8 to one input of adding circuit 9. The luminance signal Y has the full bandwidth of the video color signal, i.e., 3.5 MHz.

According to the present invention, the three color signals R,G and B appearing at input terminals 1, 2 and 3 are additionally fed to a further matrix 10 which combines these color signals to produce a luminance signal $Y_M$ according to the equation $Y_M = 0.33\ (R + G + B)$. The luminance signal $Y_M$ appearing at the output of matrix 10 is then reversed in polarity in inverting amplifier 11 which reverses and the signal $-Y_M$ is fed to the other input of the adding circuit 6. The circuits 6 and 11 thus form a subtracting circuit for the signals $Y_M$ and the three line sequential color signals. At the output of adder stage 6 there are thus produced the chrominance signals $R - Y_M$, $G - Y_M$ and $B-Y_M$. These chrominance signals are then fed to a low pass filter 12 which limits the band-width thereof to the lower frequency range of the video signal, i.e., below 0.5 MHz. The output signals from filter 12 are fed to the other input of adding circuit 9 whose output is connected to the input of the video recorder 13. The delay member 16 serves to provide compensation for the longer travel time of the signals in path 4, 5, 6, 12 which have a narrower bandwidth than the luminance signal Y.

Figure 2:
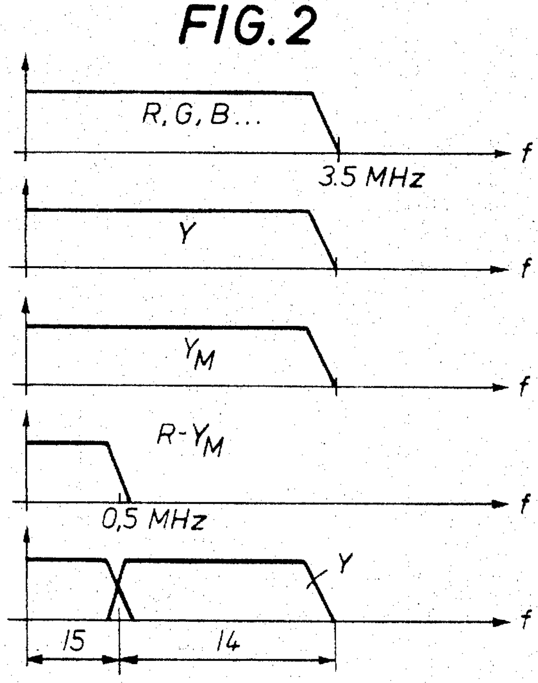
FIG. 2 shows the bandwidths of the individual signals in the circuit of FIG. 1

The operation of the circuit is now as follows:

In the upper frequency range 14 of 0.5 to 3.5 MHz (FIG. 2) the standard luminance signal Y is recorded as in the known circuits. However, in the lower frequency range 15, below 0.5 MHz, it is not, as in the known circuits, the chrominance signals (R−Y), (G−Y) and (B−Y) which are recorded but rather the chrominance signals $(R-Y_M)$, $(G-Y_M)$ and $(B-Y_M)$ and additionally the standard luminance signal Y.

Thus recording is effected, for example, in a line with the color signal R within the lower frequency range 15 of the following signal:

$$R - Y_M + Y = R + (Y - Y_M).$$

Thus, within the lower frequency range 15, the correction signal $Y - Y_M$, which is independent of this sequence, is transmitted in addition to the three line sequential color signal R, G, B.

In the playback circuit according to the above mentioned patent as mentioned above, if the color signals are recorded without the feature of the present invention, the luminance signal $Y_M$ is generated during playback whereas the luminance signal Y is actually the desired correct signal. Thus the luminance signal generated during playback deviates from the correct value by the value $Y_M - Y$. As can obviously be seen, in the present invention the signal $Y - Y_M$, which is required to compensate for this deviation in the luminance signal during playback, is the one which is introduced in the lower frequency range 15 so that the error $Y_M - Y$ occurring in the known circuit during playback is eliminated. The corresponding applies for the color signals G and B.

In upper frequency range 14 conditions are unchanged compared to the known circuit so that the luminance signal Y will be correct in this frequency range. For black and white pictures, $R = G = Y = Y_M$ and $R - Y_M$, $G - Y_M$, $B - Y_M = O$ so that in this case no signal at all will pass through low pass filter 12 and the recorded signal is formed only by the broadbanded luminance signal Y from lead 8.

It will be understood that the above description of the present invention is susceptible to various modifications, changes and adaptations, and the same are intended to be comprehended within the meaning and range of equivalents of the appended claims.

I claim:

1. A recording circuit for producing a three line sequential color television signal (TRIPAL) in the lower frequency range of the total video bandwidth of the television signal for recording and eventual playback by a playback circuit wherein each of the chrominance signals which were sequentially recorded is repeated during its off periods by means of two delay lines each having a delay of one picture line scanning period, and a luminance signal is generated by the addition of the currently received signal, the signal delayed by one picture line period and the signal delayed by two picture line periods in a matrix which deviates from the standard matrix for the luminance signal for TRIPAL signals, said recording circuit comprising in combination: first, second and third input terminals at which the three color signals representing red (R), green (G) and blue (B) of the television signal are present, switch means, operating at the horizontal picture line sweep frequency, for sequentially connecting each of said first, second and third input terminals in turn to a single output terminal thereof; an adding circuit having two inputs and an output, one of said inputs being connected to said output of said switch means; first matrixing means for combining the color signals at said first, second and third input terminals in the same manner as the matrix to be used during playback to produce a luminance signal $Y_M$; a signal inverting amplifier having its input connected to the output of said first matrixing means and its output connected to the other input of said adding circuit; and, a low pass filter means connected to the output of said adding circuit for limiting the bandwidth of the output signal from said adding circuit to said lower frequency range.

2. The recording circuit defined in claim 1 wherein said first matrixing means combines said color signals to produce the luminance signal $Y_M = 0.33(R+G+B)$.

3. The recording circuit defined in claim 1 further including: a second matrixing means for combining the color signals at said first, second and third input terminals to produce the standard TRIPAL luminance signal Y; a further adder circuit having its inputs connected to the outputs of said low pass filter means and said second matrixing means; and a video recorder connected to the output of said further adder circuit.

4. The recording circuit defined in claim 3 wherein said second matrixing means combines said color signals to produce the luminance signal $Y = 0.59G + 0.3R + 0.11B$.

5. The recording circuit defined in claim 4 wherein said first matrixing means combines said color signals to produce the luminance signal $Y_M = 0.33\ (R+G+B)$.

6. The recording circuit defined in claim 5 wherein the full bandwidth of said video signal is 3.5 MHz and wherein said low pass filter means limits the bandwidth of the output signal therefrom to 0.5 MHz.

7. The recording circuit defined in claim 1 wherein said first matrixing means is the same matrixing means used during playback.

* * * * *